United States Patent
Chen et al.

(10) Patent No.: US 8,215,670 B2
(45) Date of Patent: Jul. 10, 2012

(54) RETAINER AND INFLATOR

(75) Inventors: Jianlin Chen, Aichi (JP); Atsuhiro Arai, Aichi (JP); Yoji Tasaki, Aichi (JP)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/017,578

(22) Filed: Jan. 31, 2011

(65) Prior Publication Data

US 2012/0025504 A1    Feb. 2, 2012

Related U.S. Application Data

(63) Continuation of application No. 12/305,412, filed as application No. PCT/JP2007/061543 on Jun. 7, 2007, now Pat. No. 7,891,703.

(30) Foreign Application Priority Data

Jun. 20, 2006 (JP) .................................. 2006-170412

(51) Int. Cl.
*B60R 21/26* (2011.01)
(52) U.S. Cl. ...................................... 280/741; 280/736
(58) Field of Classification Search .................. 280/736, 280/741; 102/530, 531
See application file for complete search history.

(56) References Cited

U.S. PATENT DOCUMENTS

| | | | | |
|---|---|---|---|---|
| 4,561,675 A | * | 12/1985 | Adams et al. | 280/734 |
| 5,951,040 A | * | 9/1999 | McFarland et al. | 280/736 |
| 6,257,617 B1 | * | 7/2001 | McFarland et al. | 280/736 |
| 6,290,256 B1 | * | 9/2001 | McFarland et al. | 280/736 |
| 6,378,901 B1 | * | 4/2002 | Yamazaki et al. | 280/741 |
| 6,527,297 B1 | | 3/2003 | Parkinson et al. | |
| 7,891,703 B2 | * | 2/2011 | Chen et al. | 280/736 |
| 2002/0053788 A1 | * | 5/2002 | Iwai et al. | 280/736 |
| 2005/0184497 A1 | | 8/2005 | Miyaji et al. | |

FOREIGN PATENT DOCUMENTS

| | | |
|---|---|---|
| EP | 1 331 143 A1 | 7/2003 |
| JP | 09-207705 | 8/1997 |
| JP | 11-334517 | 12/1999 |
| JP | 2001-233167 A | 8/2001 |
| JP | 2004-507435 A | 3/2004 |
| WO | WO-01/62558 A1 | 8/2001 |
| WO | WO-02/18302 A1 | 3/2002 |

* cited by examiner

*Primary Examiner* — Ruth Ilan
*Assistant Examiner* — Robert A Coker
(74) *Attorney, Agent, or Firm* — Harness, Dickey & Pierce, P.L.C.

(57) ABSTRACT

An inflator includes a plate-like retainer that is placed in a pressure container of the inflator for producing gas to be supplied to an airbag. At the center of the inflator is formed a fitting section fitted to a tube placed in the pressure container. The tube separates an ignition source and a gas generation agent. At least one pressure release hole is provided on the outer side of the outer periphery of the fitting section. The retainer has a step formed at a portion where the outer periphery of the retainer is in contact with the filter. The retainer and inflator may have simple structures not affecting productivity and reliably preventing gas leakage between the retainer and a filter.

17 Claims, 7 Drawing Sheets

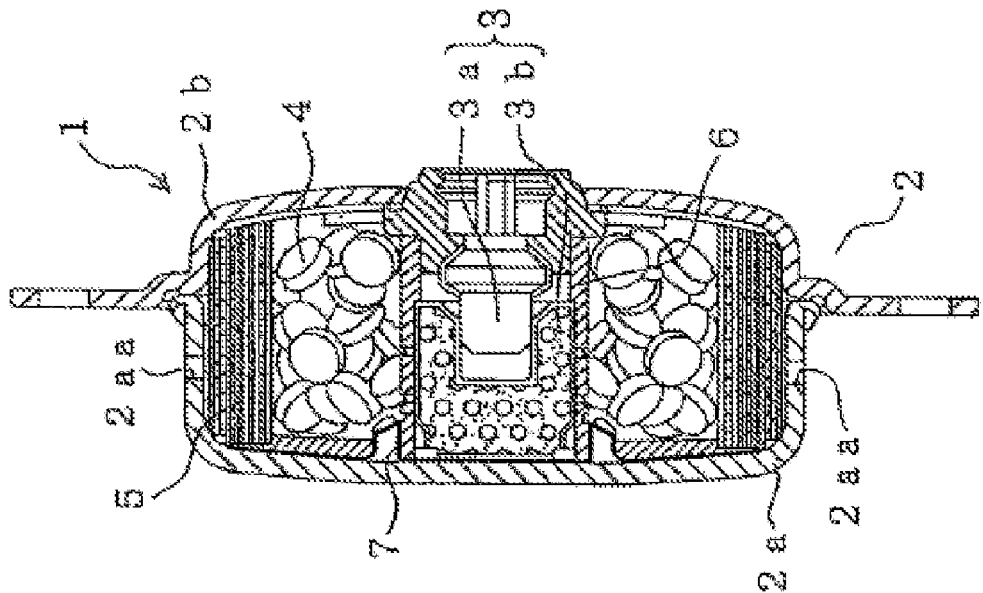
Figure 7 (a) PRIOR ART
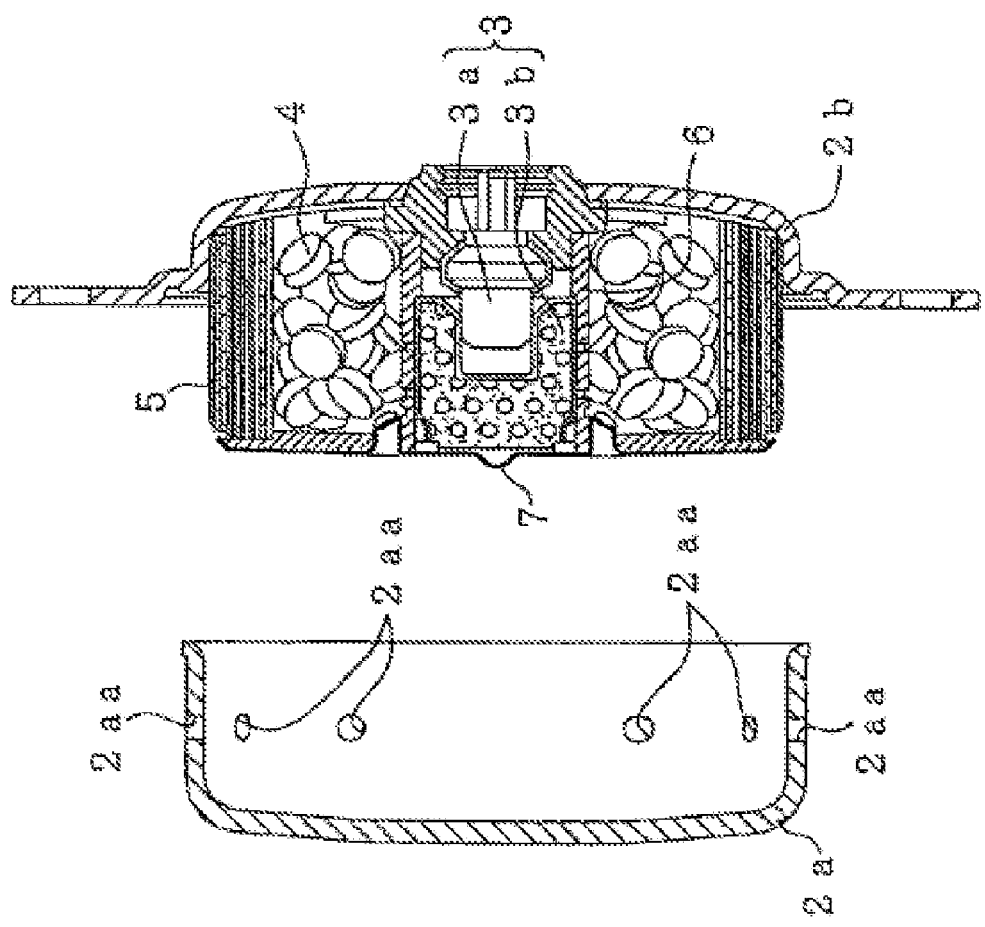
Figure 7 (b) PRIOR ART

RETAINER AND INFLATOR

CROSS-REFERENCE TO RELATED APPLICATIONS

This application is a continuation of U.S. patent application Ser. No. 12/305,412, filed Dec. 18, 2008, which is a 371 U.S. National Stage of International Application No. PCT/JP2007/061543, filed Jun. 7, 2007. This application claims the benefit of Japanese Patent Application No. JP 2006-170412, filed Jun. 20, 2006. The entire disclosures of each of the above applications are incorporated herein by reference.

FIELD

The present disclosure relates to a retainer which is one of the constituent parts of an inflator, and to the inflator equipped with this retainer. Inflator generates gas and the gas is supplied to the airbag which is installed in automobiles as a safety device.

BACKGROUND

This section provides background information related to the present disclosure which is not necessarily prior art.

Airbag device comprises an inflator which is a gas-generating device, and an airbag. The airbag deploys due to the gas generated by the inflator, protecting passengers from impact during a collision.

As shown in FIG. 7, an inflator 1 typically includes a pressure container 2 having a diffuser 2a and a shallow dish base 2b in the pressure container 2, and an ignition means 3 operating due to an electrical signal generated after a collision is detected and gas generant 4 ignited by the ignition means 3 are housed. The ignition means 3 is composed of an initiator 3a and ignition enhancer 3b.

At the time of collision, the gas generant 4 burns, and instantaneously harmless gas is generated. The generated gas passes through a filter 5 and is finally discharged from gas exits 2aa. In order to burn the gas generant 4 safely and stably, a diffuser 2a, shown separately in FIG. 7(a) in a state prior to welding, is welded to the base 2b, as shown in FIG. 7(b), so that the gas generant 4 is enclosed.

Patent Reference 1: Japanese Laid-Open Patent Application No. H11-334517

SUMMARY

This section provides a general summary of the disclosure, and is not a comprehensive disclosure of its full scope or all of its features.

In order to prevent the filter 5 from dropping and the gas generant 4 from spilling out of the filter 5 when in welding the inflator, a disk-shaped retainer 7 as shown in FIG. 8 is fixed onto a tube 6 which separates the ignition means 3 from the gas generant 4, thereby retaining the filter 5 and the gas generant 4. This retainer 7 also serves the function of preventing gas leakage from between the inner surface of the diffuser 2a and the filter 5 when the inflator 1 operates.

The pressure container of inflator expands greatly, as a result of the combustion pressure of the gas generant when the inflator operates. As this happens, the retainer also expands greatly in an outward direction shown in FIG. 10, from the state prior to the inflator operation shown in FIG. 9.

At this time, large gaps d as shown in FIG. 11 are formed between the retainer 7 and the filter 5 which were originally in close contact with each other. When such large gaps are formed, gas starts to leak from these gaps, and solid residue is discharged in large quantities to outside of the inflator.

As shown in FIG. 12, the retainer 7 having a crimped edge 7a on the outer periphery is believed to be effective in sealing the large gaps formed between the filter and the retainer when the inflator operates. By attaching the crimped edge 7a so that it is introduced inside the filter 5, the retainer 7 with the crimped edge can maintain a sealed state of the gap between the retainer 7 and the filter 5, even if the pressure container 2 expands and changes its shape.

However, there are two problems with this crimped edge retainer.

First, the crimped edge must be fabricated in a shape so that the crimped edge will enter the filter in the state of its arrangement. Accordingly, the shape of the retainer becomes complicated. Furthermore, high accuracy of manufacturing is required for positioning an engaging member to engage with the tube, with the result that production is no longer easy, and the manufacturing costs greatly increase.

Second, it is required to press fit the crimped edge of the retainer into the filter in order to fix the filter. Since a dimple 7b in the center and the crimped edge 7a on the outer periphery must be pressed inward simultaneously, it becomes extremely difficult to match their positions. It is expected that the amount of scrap will increase during manufacture, since the production yield becomes poor.

The problem which the present invention aims to solve is that in the case of a conventional retainer, high accuracy of manufacturing is required, production is no longer easy, and it becomes extremely difficult to match the positions in order to seal the large gap between the filter and the retainer which are formed when the inflator operates.

Means for Solving the Problem

An object of the present invention is to provide a retainer which reliably prevents leakage of gas from between the retainer and a filter, and has a simple construction without negative effects on productivity. The retainer has a plate-shaped design and is inserted into the pressure container of inflator which generates gas being supplied to airbag. The retainer comprises an engaging section formed at the center which engages with a tube provided to separate an ignition means from a gas generant. The retainer also comprises at least one pressure release hole provided on the outer periphery side of the engaging section.

In the case where a step portion is provided at an area of contact with the filter on the outer periphery side, the gas passageway becomes long, making it difficult for gas to pass between the retainer and the filter.

In the present invention, the positions of the pressure release holes can be determined in any desired manner, but it is preferable when they are provided in a position according to point symmetry with respect to the center of the retainer or in a position according to line symmetry with respect to the center line of the retainer, so that the pressure between the retainer and the pressure container is distributed uniformly. When the pressure release holes are provided on a plurality of circumferences, the pressure can be favorably distributed between the retainer and the pressure container. When the pressure release holes are provided on a constant radius, it preferably reduces the excessive release of pressure from the retainer.

In an inflator equipped with the retainer of the present invention, the pressure balance on the front and back sides of the retainer is maintained during operation, and there is little deformation of the retainer caused by combustion pressure. Therefore, close contact is maintained between the step portion on the outer periphery side of the retainer and the inner side of the filter. Accordingly, it is possible to effectively prevent leakage of gas from the end of the filter, and there is little solid residue in the gas discharged from the gas discharge holes of the pressure container to outside of the inflator.

Advantageous Effects of the Invention

In the present invention, an engaging section is formed to engage with the tube at the center, and at least one pressure release hole is provided on the outer periphery side from this engaging section. As a consequence of such a simple construction, manufacturing is easy.

When the inflator operates, a portion of the gas generated within the inflator flows from the pressure release holes into the space between the retainer and the diffuser. A pressure balance is thereby maintained at the front and back sides of the retainer in the process of pressure rise due to the combustion of the gas generant. Therefore, the present invention makes it possible to reduce deformation of the retainer due to combustion pressure, and makes it possible to maintain a state of close contact between the retainer and the filter, and makes it possible to reduce solid residue in gas discharged from the gas discharge holes of the pressure container to outside of the inflator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a sectional view illustrating the construction of an inflator, and (a) is prior to welding of the pressure container, and (b) is after welding of the pressure container.

Corresponding reference numerals indicate corresponding parts throughout the several views of the drawings.

DETAILED DESCRIPTION

Figure 1:
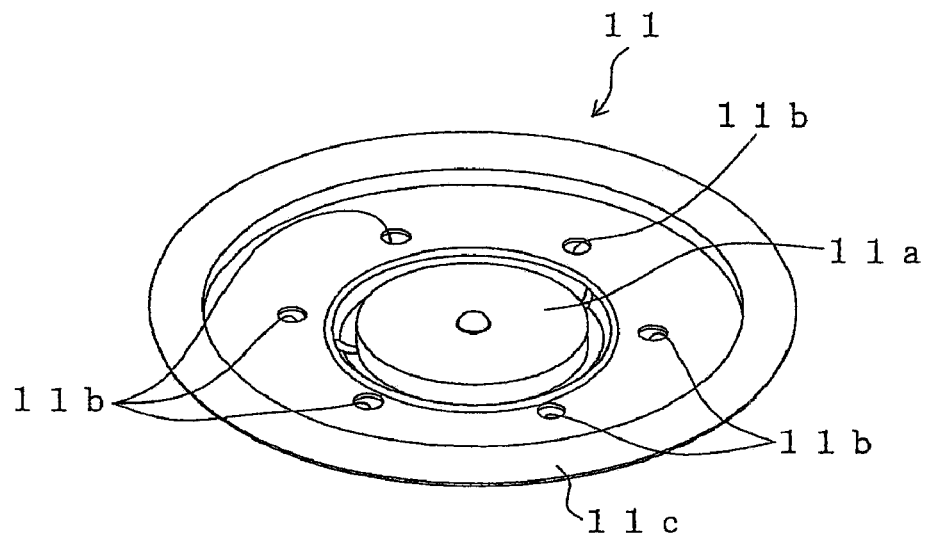
FIG. 1 is an upper perspective view of a retainer of the present invention.

Example embodiments will now be described more fully with reference to the accompanying drawings.

Description of the Reference Symbols

2 Pressure container
2aa Gas discharge hole
3 Ignition means
4 Gas generant
5 Filter
6 Tube
11 Retainer
11a Engaging section
11b Pressure release hole
11c Step portion
12 Inflator It is conceivable that a retainer provided with a crimped edge on the outer periphery would be effective in sealing the large gaps between the filter and the retainer when the inflator operates. However, this retainer is complex in shape, and requires high accuracy to produce it, and is thus not easy to manufacture. Moreover, it becomes extremely difficult to position precisely the filter and the retainer.

The present invention has a simple construction, and is easy to manufacture. The present invention also achieves the object of preventing gas from leaking between the retainer and the filter as much as possible, by providing at least one pressure release hole on the outer periphery side of the engaging section formed which engages with the tube formed in the center.

Embodiments

In the following, FIG. 1 to FIG. 4 are used to describe the preferred embodiment of the present invention.

Figure 2:
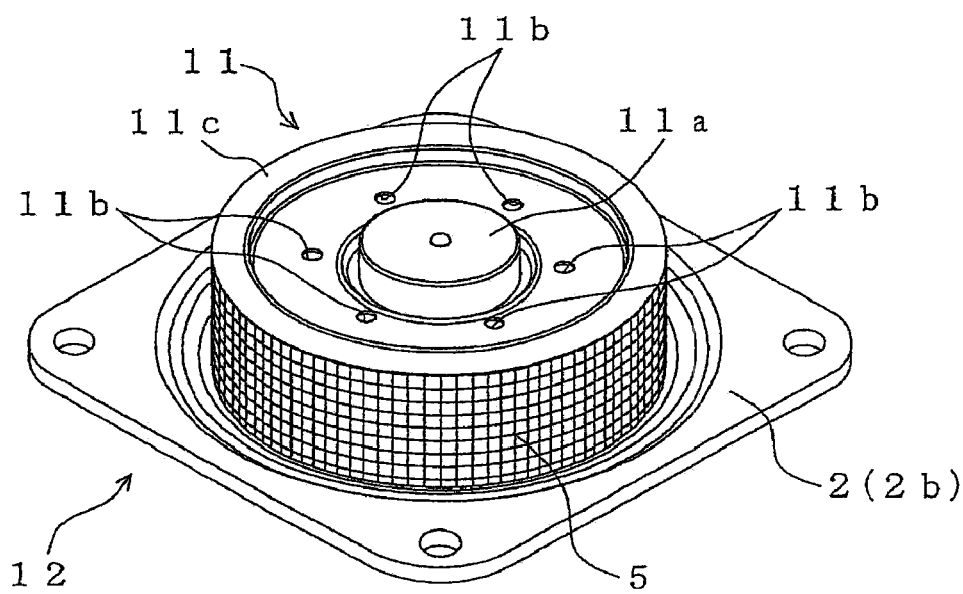
FIG. 2 is an upper perspective view of the state that the retainer is attached before welding.
Figure 3:
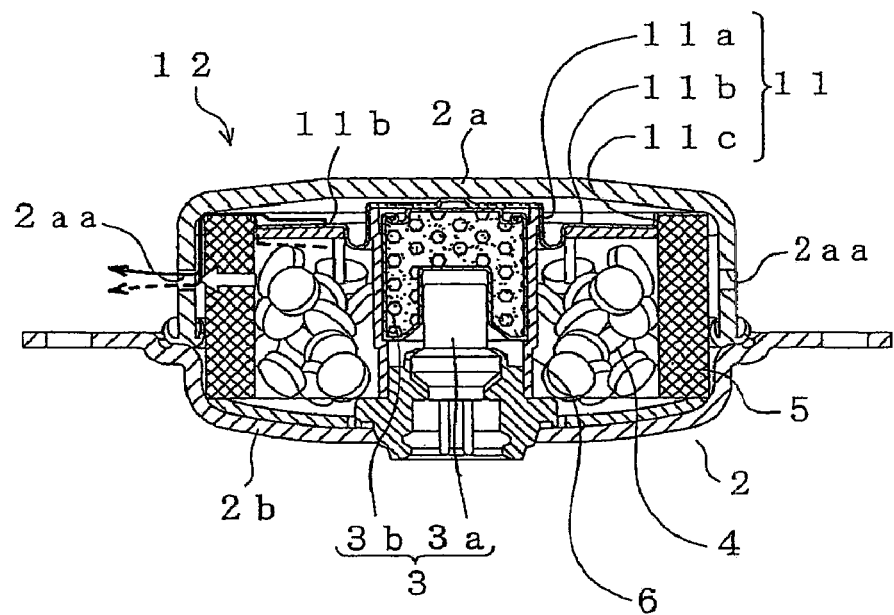
FIG. 3 is a drawing describing the mechanism whereby the amount of residue is reduced in a present invention inflator with the present invention retainer attached.
Figure 4:
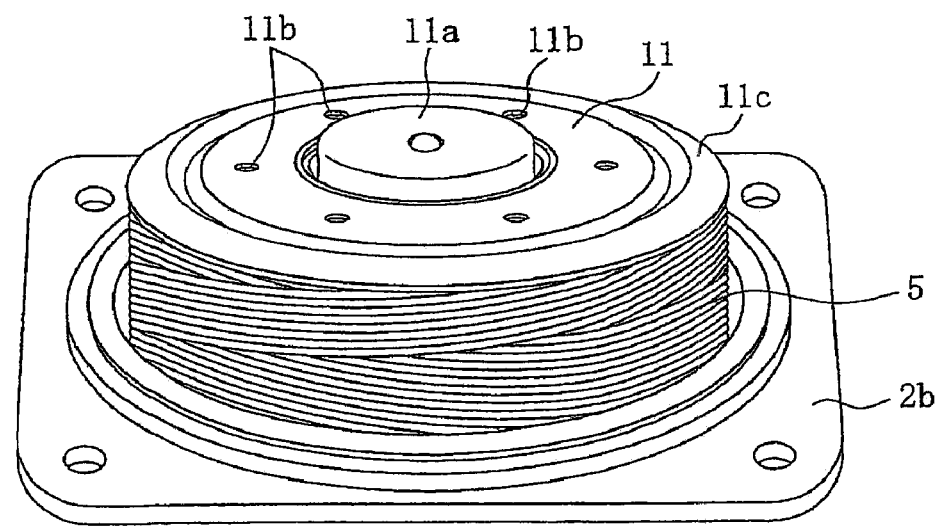
FIG. 4 is an upper perspective view of the state when the diffuser is detached after operation of the present invention inflator.

FIG. 1 is an upper perspective view of a retainer of the present invention. FIG. 2 is an upper perspective view of the state that the retainer is attached before welding. FIG. 3 is a drawing describing the mechanism whereby the amount of residue is reduced in a present invention inflator with the present invention retainer attached. FIG. 4 is an upper perspective view of the state when the diffuser is detached after operation of the present invention inflator.

The present invention retainer 11 has an engaging section 11a formed centrally for the purpose of engaging with the front end of the tube 6 disposed within the pressure container 2. In addition, six (6) pressure release holes 11b are provided in a constant radius above the insertion position of the gas generant 4 on the outer periphery side of the engaging section 11a, for example.

It is desirable for these pressure release holes 11b to be provided at circumferentially equidistant positions, so that the gas pressure balance is suitably maintained on the front and back sides of the retainer. The radial position and the number thereof are determined for the purpose.

Figure 10:
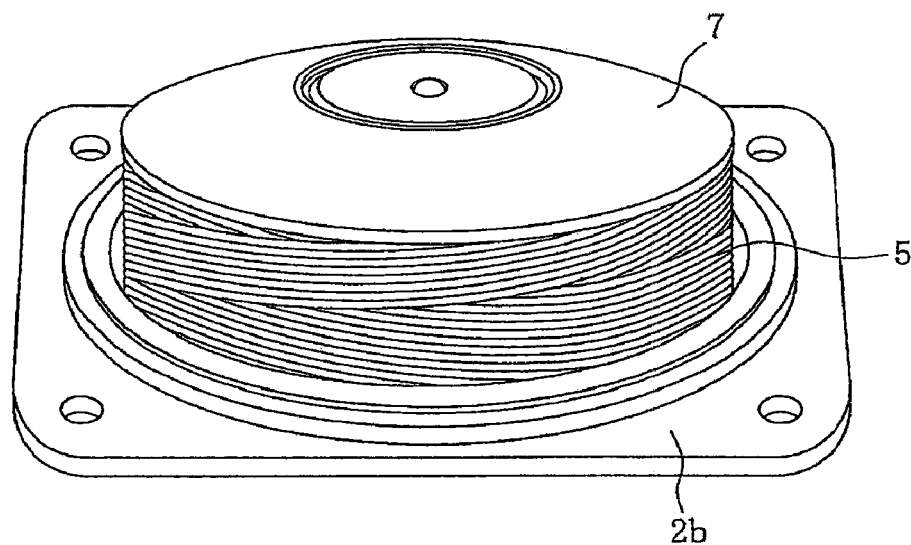
FIG. 10 is an upper perspective view of the state when a diffuser is detached after operation of a conventional inflator.
Figure 11:
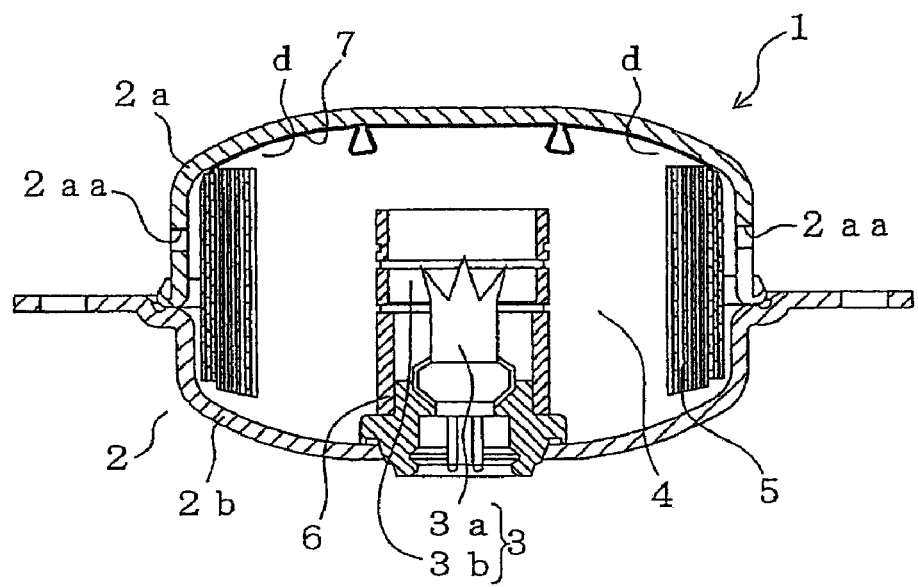
FIG. 11 is a drawing illustrating large gaps between a filter and a retainer, formed during operation of a conventional inflator.
Figure 12:
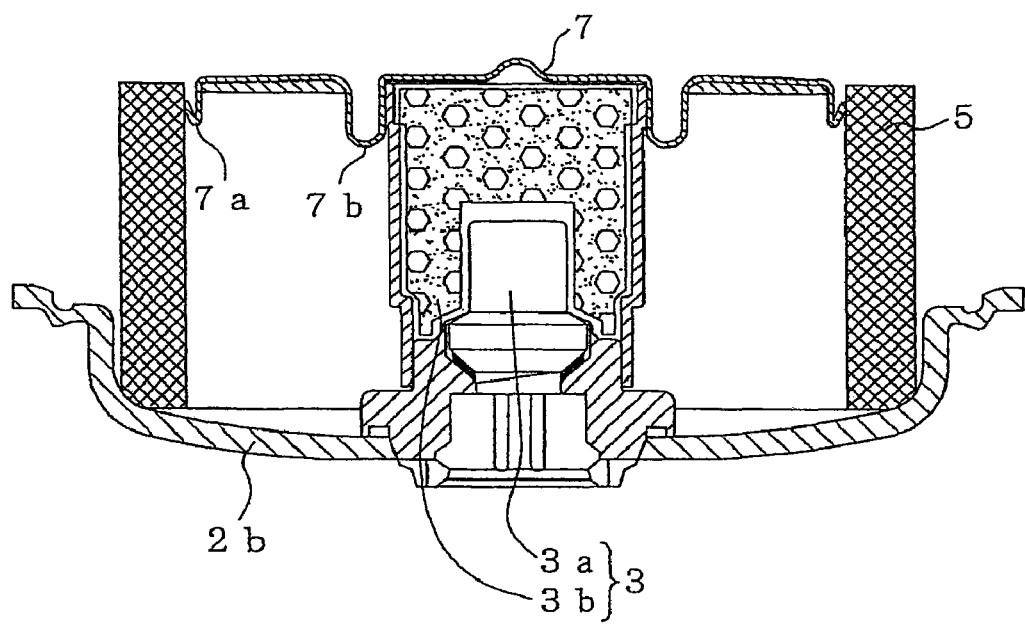
FIG. 12 is a sectional view illustrating the state of attachment of the retainer with a crimped edge.

In the case of the present invention retainer 11 shown in FIG. 1 to FIG. 4, there is also a step portion 11c formed at the area of contact with the filter 5 on the outer periphery side. This step portion 11c is formed so as to lengthen the gas passageway between the retainer 11 and the filter 5, making it difficult for the gas to pass through. Thus, there is no need to match with the filter 5 with high accuracy like a crimped edge 7a of the retainer 7 with the crimped edge shown in FIG. 10.

Such a present invention retainer 11 has a simple construction, with the engaging section 11a and the pressure release hole 11b and, as needed, a simple step portion 11c. Since high accuracy of manufacturing is needed only for the engaging section 11a, so manufacturing becomes easy and it can be produced at lower cost.

In the case of the present invention inflator 12, in which the retainer 11 is attached, when the inflator 12 operates, the flow of gas from inside of the inflator 12 is conceived of according to the following three (3) routes. These three routes are explained below using FIG. 3.

In the first route, the gas escapes to the top of the retainer 11 from the pressure release hole 11b provided to the retainer 11. The gas passes through the gaps between the inner periphery of the diffuser 2a and the retainer 11, and reaches the gas discharge hole 2aa (shown by the arrow with a thick solid line in FIG. 3).

This first route is longer than the other two routes, so the volume of flowing gas is thought to be low. Furthermore, due to the fact that there is little solid residue passing through the pressure release hole 11b, and due to the fact that it passes through the gaps between the inner periphery of the diffuser 2a and the retainer 11, even if the solid residue were to pass through the pressure release hole 11b, there is thought to be little possibility that the solid residue would be discharged.

In the second route, the gas passes between the retainer 11 and the filter 5, and reaches the gas discharge hole 2aa of the pressure container (shown by the arrow with a thick broken line in FIG. 3). When the volume of gas passing through this second route becomes large, the amount of solid residue discharged to outside of the inflator 12 becomes large.

In the third route, the gas passes through the filter 5, and reaches the gas discharge hole 2aa of the pressure container (shown by the white arrow with a black outline in FIG. 3). This third route is considered to be the easiest one for the gas to get through, in comparison with the first and second routes, and is the most desirable route.

Since a small volume of gas flows through the first route when the present invention inflator 12 operates, a pressure balance is maintained above and below the retainer 11, and there is little deformation of the retainer 11 by combustion pressure (see FIG. 4). There is very little solid residue in the gas discharged to the outside of the inflator 12 from the gas discharge hole 2aa of the pressure container 2 via this first route.

Since close contact is maintained between the retainer 11 and the filter 5, the volume of gas flowing through the second route can be kept low. Consequently, the amount of solid residue in the gas discharged to outside of the inflator 12 is small.

Comparative experiments were performed, using the inflator 12 of the present invention shown in FIG. 1 with the retainer 11 of the present invention shown in FIGS. 2 and 3, and the conventional inflator 1 shown in FIG. 7(b) with the conventional retainer 7 shown in FIG. 7. The results are shown in TABLE 1 below.

TABLE 1

| | | Test Temperature (° C.) | Residue within the Pressure Container (g) | Free Particles in Air (g) | Total Amount of Residue (g) |
|---|---|---|---|---|---|
| conventional | 1 | 85 | 1.60 | 0.26 | 1.86 |
| | 2 | 85 | 2.56 | 0.37 | 2.93 |
| Present invention | 3 | 85 | 0.50 | 0.17 | 0.67 |
| | 4 | 85 | 0.60 | 0.20 | 0.80 |
| | 5 | 85 | 0.47 | 0.13 | 0.60 |

TABLE 1 clearly shows that using an inflator attaching the present invention retainer makes it possible to reduce greatly the amount of residue discharged from the inflator to the outside. This means that above explanations are correct with regard to the gas flow routes from inside the inflator when the inflator operates.

The present invention is not limited to the above example, and may of course be suitably modified, as long as it is within the scope of the technical concepts recited in the claims.

Figure 5:
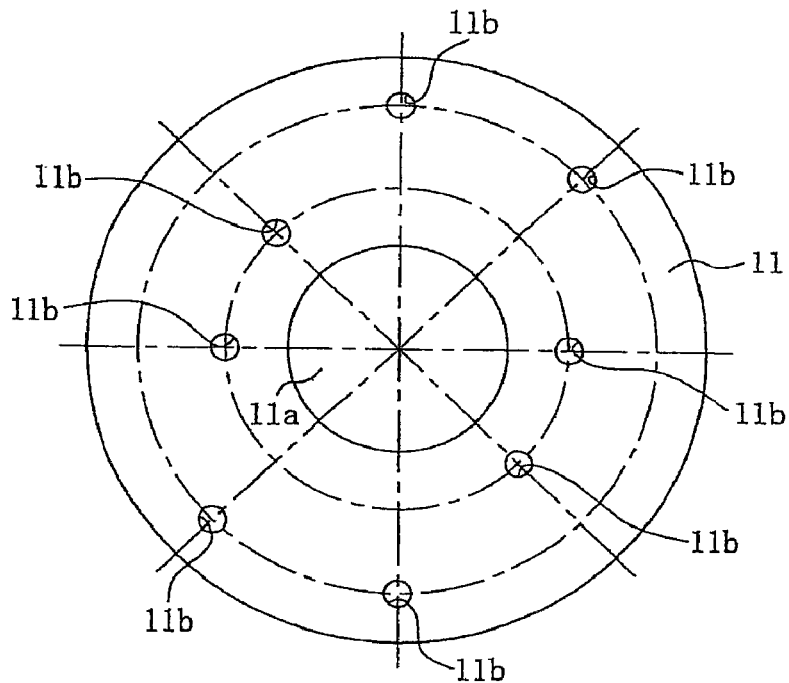
FIG. 5 is a plane view showing a retainer according to an embodiment of the present invention.
Figure 6:
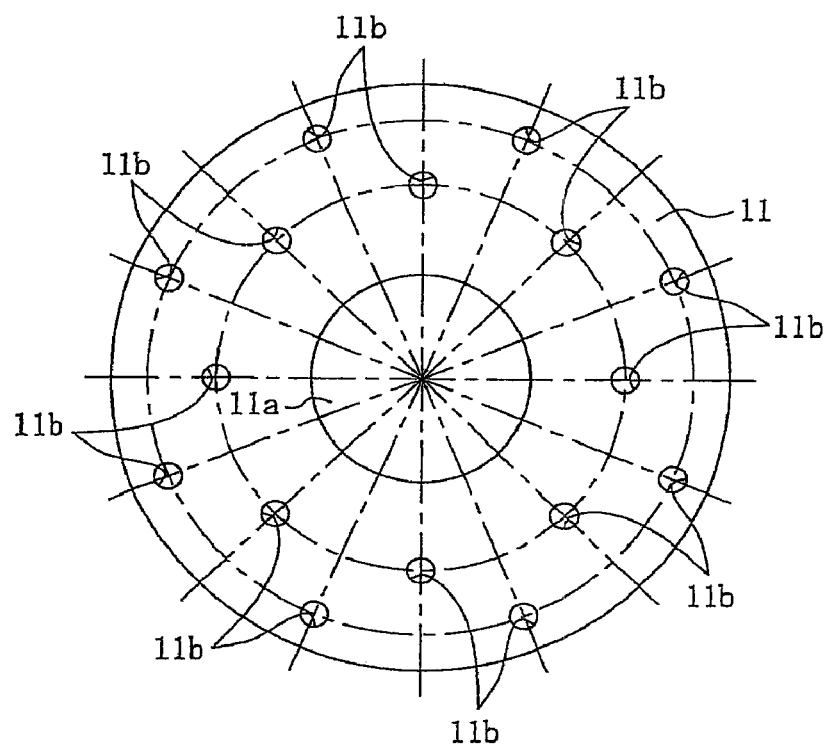
FIG. 6 is a plane view showing a retainer according to another embodiment of the present invention.
Figure 8:
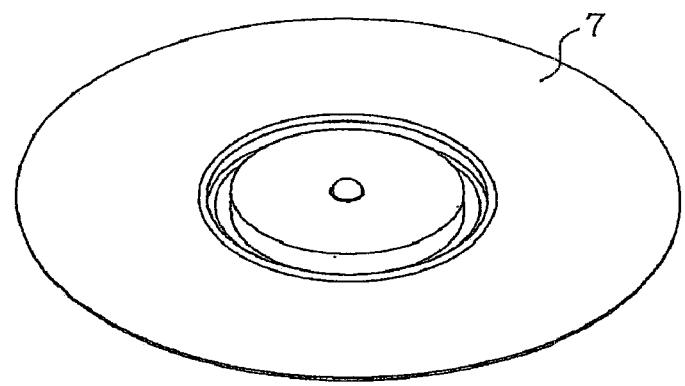
FIG. 8 is an upper perspective view of a plate-shaped retainer.
Figure 9:
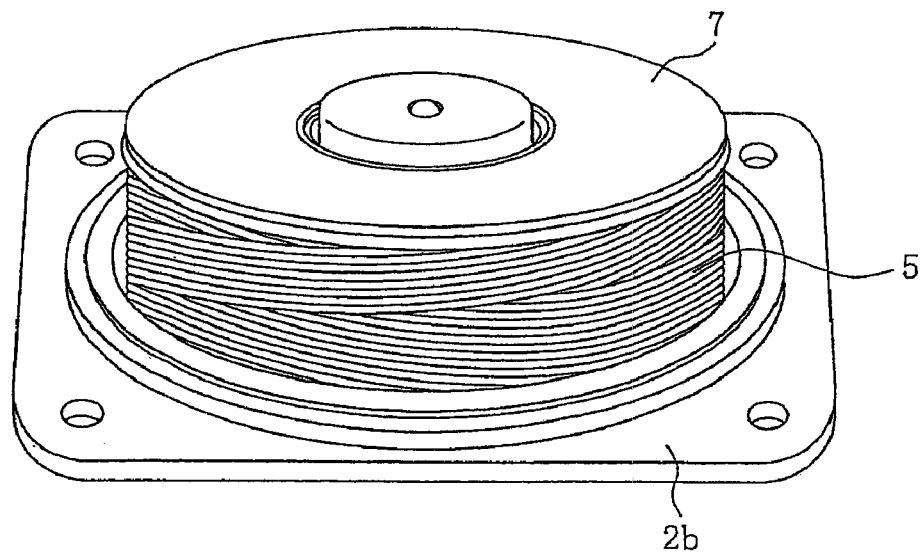
FIG. 9 is an upper perspective view of the state before operation of an inflator, prior to attaching a diffuser to a base by welding.

For example, in the example illustrated by FIG. 1-4, the retainer 11 is shown to be formed with the step portion 11c at an area of contact with the filter on the outer periphery side, but it is also acceptable not to provide a step portion, as shown in the examples of FIG. 5 and FIG. 6.

These FIGS. 5 and 6 show examples of other variations in disposition of pressure release holes 11b provided to the retainer 11. These pressure release holes 11b are provided on two circumferences. In FIG. 5, they are disposed according to point symmetry with respect to the center of the retainer 11. In FIG. 6, they are disposed according to line symmetry with respect to the center line of the retainer 11. These variations serve to maintain a suitable pressure balance on both the front and the back surfaces of the retainer, and a disposition having geometrical symmetry is preferable for suitably imparting a pressure balance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An airbag inflator comprising:
a housing defining a cavity and at least one gas exit;
an initiator disposed in the cavity;
a gas generant material disposed in the cavity and radially surrounding the initiator;
a filter disposed in the cavity and radially surrounding the gas generant;
a plate-shaped retainer disposed in the housing and defining at least one pressure release hole;
a first gas flow path radially extending from the gas generant material through the filter and to the at least one gas vent; and
a second gas flow path extending from the gas generant material through the at least one pressure release hole, around the filter by passing between the housing and the filter, and to the at least one gas vent.

2. The airbag inflator according to claim 1, wherein the plate-shaped retainer includes an engaging section formed at a center for engaging a tube provided in the pressure container to separate an ignitor device from a the gas generant and the at least one pressure release hole is provided on an outer peripheral side of the engaging section.

3. The airbag inflator according to claim 2, wherein the plate-shaped retainer further includes a step portion formed at an area of contact with the filter on the outer peripheral side.

4. The airbag inflator according to claim 3, wherein the at least one pressure release hole is provided on an inner peripheral side of the step portion.

5. The airbag inflator according to claim 1, wherein the at least one pressure release hole is disposed according to point symmetry with respect to a center of the retainer.

6. The airbag inflator according to claim 1, wherein the at least one pressure release hole is disposed in a position according to line symmetry with respect to a line passing through a center of the retainer.

7. The airbag inflator according to claim 1, wherein the at least one pressure release hole is provided on a constant radius.

8. The airbag inflator according to claim 1, wherein, the plate-shaped retainer includes an engaging section formed at a center for engaging a tube in the housing to separate an ignitor device from the gas generant, the retainer including the at least one pressure release hole on an outer peripheral side of the engaging section.

9. The airbag inflator according to claim 8, wherein the retainer includes a step portion formed at an area of contact with the filter on the outer peripheral side.

10. The airbag inflator according to claim 9, wherein the at least one pressure release hole is provided on an inner peripheral side of the step portion.

11. An airbag inflator comprising:
a housing defining a cavity and at least one gas exit;
an initiator disposed in the cavity;
a gas generant material disposed in the cavity and radially surrounding the inflator;
a filter disposed in the cavity and radially surrounding the gas generant;
a plate-shaped retainer disposed in the housing and defining at least one pressure release hole; and
a gas flow path extending from the gas generant material through the at least one pressure release hole, around the filter by passing between the housing and the filter and to the at least one gas vent.

12. The airbag inflator according to claim 11, wherein the retainer includes an engaging section formed at a center for engaging a tube in the pressure container to separate an ignitor device from the gas generant, the retainer including the at least one pressure release hole on an outer peripheral side of the engaging section.

13. The airbag inflator according to claim 12, wherein the retainer includes a step portion formed at an area of contact with the filter on the outer peripheral side.

14. The airbag inflator according to claim 13, wherein the at least one pressure release hole is provided on an inner peripheral side of the step portion.

15. An airbag inflator comprising:
a housing defining a cavity and at least one gas exit;
an initiator disposed in the cavity;
a gas generant material disposed in the cavity and radially surrounding the inflator;
a filter disposed in the cavity and radially surrounding the gas generant;
a plate-shaped retainer disposed in the housing and including an engaging section formed at a center for engaging a tube in the pressure container to separate an ignitor device from the gas generant, the retainer pressure release defining at least one pressure release hole on an outer peripheral side of the engaging section;
a first gas flow path radially extending from the gas generant material through the filter and to the at least one gas exit; and
a second gas flow path extending from the gas generant material through the at least one pressure release hole, around the filter by passing through a gap between the retainer and the housing and to the at least one gas exit.

16. An airbag inflator comprising:
a housing defining a cavity and at least one gas exit;
an initiator disposed in the cavity;
a gas generant material disposed in the cavity and radially surrounding the inflator;
a filter disposed in the cavity and radially surrounding the gas generant;
a plate-shaped retainer disposed in the housing and defining at least one flow restricting hole; and the retainer including an engaging section formed at a center for engaging a tube in the pressure container to separate an ignitor from the gas generant, the retainer including the at least one flow restricting hole on an outer peripheral side of the engaging section; and
a gas flow path extending from the gas generant material through the at least one flow restricting hole, around the filter by extending through a gap between the retainer and the housing and to the at least one gas exit.

17. An airbag inflator comprising:
a housing defining a cavity and at least one gas exit;
an initiator disposed in the cavity;
a gas generant material disposed in the cavity and radially surrounding the initiator;
a filter disposed in the cavity and radially surrounding the gas generant;
a plate-shaped retainer disposed in the housing and defining at least one pressure release hole;
a first gas flow path extending from the gas generant material through the at least one pressure release hole, around the filter by passing between the housing and the filter, and to the at least one gas vent;
a second gas flow path extending from the gas generant material, between the retainer and the filter, around the filter by passing between the housing and the filter, and to the at least one gas vent;
a third gas flow path radially extending from the gas generant material through the filter and to the at least one gas vent.

* * * * *